No. 864,142. PATENTED AUG. 20, 1907.
A. M. GRUBBS.
ANIMAL TRAP.
APPLICATION FILED MAR. 24, 1906.

Witnesses:
Jas. H. Kouns.
Cecil Long.

Inventor,
Albert M. Grubbs
by T. J. Geisler
Atty.

UNITED STATES PATENT OFFICE.

ALBERT M. GRUBBS, OF FOREST GROVE, OREGON, ASSIGNOR OF ONE-HALF TO J. N. HOFFMAN, OF FOREST GROVE, OREGON.

ANIMAL-TRAP.

No. 864,142.  Specification of Letters Patent.  Patented Aug. 20, 1907.

Application filed March 24, 1906. Serial No. 307,938.

*To all whom it may concern:*

Be it known that I, ALBERT M. GRUBBS, a citizen of the United States, and a resident of Forest Grove, Washington county, State of Oregon, have invented a new and useful Improvement in Animal-Traps, of which the following is a specification, reference being had to the accompanying drawings as constituting a part thereof.

This invention has for its object to obtain an all-metal trap, of simple and inexpensive construction, and arranged as a whole to do effective work; and to this end it comprises the features and combination hereinafter described and claimed.

Figure 1:
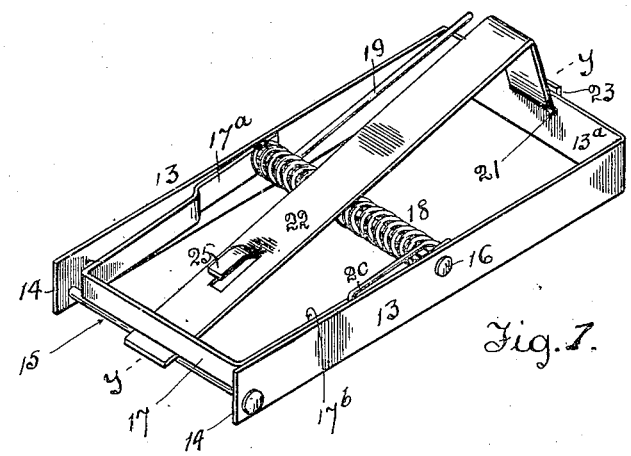
Figure 2:
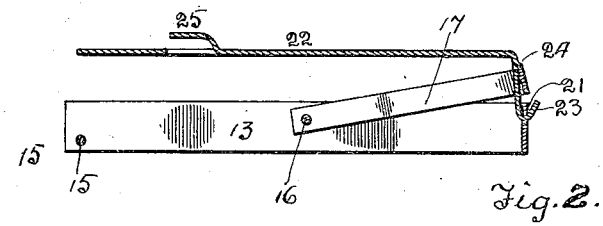
Figure 3:
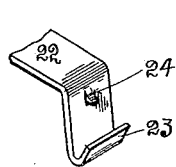
Figure 4:
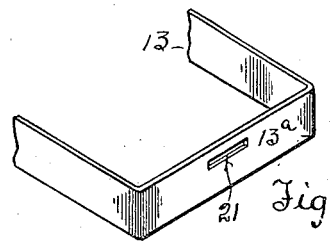

In the drawings—Figure 1 is a perspective view of my improved trap. Fig. 2 is a longitudinal section of the same, on the line y—y, Fig. 1, the trap being set. Fig. 3 is a detail view of one end of the trip lever. Fig. 4 is a detail view of one end of the frame.

The numeral 13, indicates a substantially U-shaped metal frame, the free ends 14, of which are connected by a rivet 15. A bar 16, extends across the frame 13, at an intermediate point, and has mounted thereon a U-shaped setting jaw 17. The side members 17ª and 17ᵇ, of the jaw 17, are provided with openings through which passes the bar 16, and around the bar is a coiled spring 18, one end 19, of which bears on the cross-bar of the frame 13, while its opposite end 20, engages with the member 17ᵇ, of the frame 17.

The rear cross-bar 13ª, of the frame 13, is provided with a slot 21, in which is hinged a trip lever 22. This lever is bent at one end, and at its extremity it is turned upwardly at 23, to engage the slot 21, to provide a hinge connection. In the bent portion of the trip lever is formed a shoulder 24, to coöperate with the cross-bar of the setting jaw 17. At or near the opposite end of the trip lever, is formed a bait hook 25, or other means for securing the bait.

In operation, the setting jaw is turned back until its cross-bar slips over the shoulder 24, and is caught thereby, the trip lever of course being slightly elevated to cause the engagement of the shoulder with said cross-bar. It will be noted that the proportion of the parts are such as to just permit easy and free movement of the trip lever over the bent portion of the setting jaw. It will also be understood that when setting the trap the tension of the spring is increased to throw the said jaw forwardly when the setting lever is depressed. When the parts are in their normal position as shown in Fig. 1, the setting jaw clamps the end of the tripping lever against the rivet 15, and prevents it becoming loose or disengaged from the frame 13. The slightest depression of the extremity of the trip-lever 22, will disengage the shoulder 24, from the jaw 17, and allow the spring 18, to act, to snap the trap shut.

I claim:

1. In an animal trap, the combination of a rectangular frame a rod forming a part thereof, one end and two sides of said frame being formed from a bent strip of metal and the other end being formed by the rod connecting the free ends of said strip of metal, the bent end of the frame having a slot formed therein, an intermediate transverse rod located between the ends of the frame, a trip lever bent at one end to provide a hook to engage the slot in the end of the rectangular frame, a shoulder on said trip lever which is formed by punching the material outwardly, a substantially U-shaped jaw pivoted on the intermediate transverse rod and of such length as to pass over one end of the trip lever and engage the shoulder and hold said trip lever elevated, and a spring the tension of which normally throws the jaw away from the shoulder.

2. An animal trap comprising a frame formed at one end with a slot a rod connecting the ends of the frame, a trip lever bent at one end to provide a hook to engage the slot in the frame, a shoulder formed on the trip lever, a transverse rod extending across the frame a substantially U-shaped jaw pivoted on the transverse rod and of such length as to pass over one end of the trip lever when in one position to engage the shoulder to set the trap, and when in the opposite position engage the upper surface of the opposite end of the trip lever to hold the latter against the frame after the trap has been sprung, and a spring the normal tension of which tends to hold the jaw on the frame.

ALBERT M. GRUBBS.

Witnesses:
T. J. GEISLER,
JAS. H. KOUNS.